US012619350B2

(12) United States Patent
Macdonald et al.

(10) Patent No.: US 12,619,350 B2
(45) Date of Patent: May 5, 2026

(54) SHORTCUT FRAMEWORK FOR SUPPORTING FLEXIBLE USER INTERFACE FEATURES

(71) Applicant: ServiceNow, Inc., Santa Clara, CA (US)

(72) Inventors: Hugh David Macdonald, San Diego, CA (US); Stephanie Russell MacDonald, San Diego, CA (US); Corbin Lane Lewis, San Diego, CA (US); Wendy Beth Boucher, Santa Clara, CA (US); Jesse Alan Hausler, Boulder, CO (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/222,854

(22) Filed: Jul. 17, 2023

(65) Prior Publication Data

US 2025/0028442 A1 Jan. 23, 2025

(51) Int. Cl.
*G06F 3/04892* (2022.01)
*G06F 3/0482* (2013.01)

(52) U.S. Cl.
CPC ........ *G06F 3/04892* (2013.01); *G06F 3/0482* (2013.01)

(58) Field of Classification Search
CPC ........................... G06F 3/04892; G06F 3/0482
USPC ........................................................ 715/762
See application file for complete search history.

(56) References Cited

U.S. PATENT DOCUMENTS

| 4,941,084 | A | 7/1990 | Terada |
| 5,185,860 | A | 2/1993 | Wu |
| 5,237,518 | A | 8/1993 | Sztipanovits |
| 5,261,097 | A | 11/1993 | Saxon |
| 5,265,252 | A | 11/1993 | Rawson, III |
| 5,367,685 | A | 11/1994 | Gosling |
| 5,390,297 | A | 2/1995 | Barber |
| 5,442,791 | A | 8/1995 | Wrabetz |
| 5,452,415 | A | 9/1995 | Hotka |

(Continued)

FOREIGN PATENT DOCUMENTS

| EP | 0433979 A2 | 6/1991 |
| EP | 1607824 A2 | 12/2005 |

(Continued)

OTHER PUBLICATIONS

International Search Report and Written Opinion, PCT Application PCT/US2024/034002, mailed Oct. 7, 2024.

*Primary Examiner* — Stephen S Hong
*Assistant Examiner* — Broderick C Anderson
(74) *Attorney, Agent, or Firm* — McDonnell Boehnen Hulbert & Berghoff LLP

(57) ABSTRACT

An example embodiment may include: obtaining, by a shortcut framework associated with a graphical user interface, a shortcut event; identifying a component of the graphical user interface based on the component being associated with the shortcut event; identifying a shortcut action associated with the shortcut event, wherein the shortcut action specifies a shortcut action identifier associated with a shortcut function that modifies the graphical user interface; and dispatching the shortcut action identifier to the component to cause the component to perform the shortcut function that modifies the graphical user interface.

20 Claims, 14 Drawing Sheets

(56) References Cited

U.S. PATENT DOCUMENTS

| | | | |
|---|---|---|---|
| 5,522,042 A | 5/1996 | Fee | |
| 5,533,116 A | 7/1996 | Vesterinen | |
| 5,655,081 A | 8/1997 | Bonnell | |
| 5,659,736 A | 8/1997 | Hasegawa | |
| 5,671,412 A | 9/1997 | Christiano | |
| 5,696,701 A | 12/1997 | Burgess | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke | |
| 5,887,139 A | 3/1999 | Madison, Jr. | |
| 5,909,217 A | 6/1999 | Bereiter | |
| 5,937,165 A | 8/1999 | Schwaller | |
| 5,949,976 A | 9/1999 | Chappelle | |
| 5,978,594 A | 11/1999 | Bonnell | |
| 6,021,437 A | 2/2000 | Chen | |
| 6,041,347 A | 3/2000 | Harsham | |
| 6,088,717 A | 7/2000 | Reed | |
| 6,101,500 A | 8/2000 | Lau | |
| 6,128,016 A | 10/2000 | Coelho | |
| 6,131,118 A | 10/2000 | Stupek, Jr. | |
| 6,134,581 A | 10/2000 | Ismael | |
| 6,138,122 A | 10/2000 | Smith | |
| 6,148,335 A | 11/2000 | Haggard | |
| 6,166,732 A | 12/2000 | Mitchell | |
| 6,167,448 A | 12/2000 | Hemphill | |
| 6,175,866 B1 | 1/2001 | Holloway et al. | |
| 6,175,878 B1 | 1/2001 | Seaman | |
| 6,260,050 B1 | 7/2001 | Yost | |
| 6,263,457 B1 | 7/2001 | Anderson | |
| 6,272,150 B1 | 8/2001 | Hrastar | |
| 6,336,138 B1 | 1/2002 | Caswell | |
| 6,363,421 B2 | 3/2002 | Barker | |
| 6,393,386 B1 | 5/2002 | Zager | |
| 6,397,245 B1 | 5/2002 | Johnson, II | |
| 6,434,626 B1 | 8/2002 | Prakash | |
| 6,438,592 B1 | 8/2002 | Killian | |
| 6,456,306 B1 | 9/2002 | Chin | |
| 6,466,932 B1 | 10/2002 | Dennis | |
| 6,487,590 B1 | 11/2002 | Foley | |
| 6,505,248 B1 | 1/2003 | Casper | |
| 6,526,442 B1 | 2/2003 | Stupek, Jr. | |
| 6,621,823 B1 | 9/2003 | Mellquist | |
| 6,707,795 B1 | 3/2004 | Noorhosseini | |
| 6,742,015 B1 | 5/2004 | Bowman-Amuah | |
| 6,763,380 B1 | 7/2004 | Mayton | |
| 6,816,898 B1 | 11/2004 | Scarpelli | |
| 6,895,586 B1 | 5/2005 | Brasher | |
| 6,948,175 B1 | 9/2005 | Fong | |
| 6,985,901 B1 | 1/2006 | Sachse | |
| 7,003,564 B2 | 2/2006 | Greuel | |
| 7,028,228 B1 | 4/2006 | Lovy | |
| 7,043,537 B1 | 5/2006 | Pratt | |
| 7,043,661 B2 | 5/2006 | Valadarsky | |
| 7,062,683 B2 | 6/2006 | Warpenburg | |
| 7,096,459 B2 | 8/2006 | Keller | |
| 7,134,094 B2 | 11/2006 | Stabb | |
| 7,146,574 B2 | 12/2006 | Goldthwaite | |
| 7,197,466 B1 | 3/2007 | Peterson | |
| 7,215,360 B2 | 5/2007 | Gupta | |
| 7,216,304 B1 | 5/2007 | Gourdol | |
| 7,222,147 B1 | 5/2007 | Black | |
| 7,281,170 B2 | 10/2007 | Taylor | |
| 7,412,502 B2 | 8/2008 | Fearn | |
| 7,505,872 B2 | 3/2009 | Keller | |
| 7,593,013 B2 | 9/2009 | Agutter | |
| 7,596,716 B2 | 9/2009 | Frost | |
| 7,617,073 B2 | 11/2009 | Trinon | |
| 7,660,731 B2 | 2/2010 | Chaddha | |
| 7,676,294 B2 | 3/2010 | Baier | |
| 7,676,437 B2 | 3/2010 | Satkunanathan | |
| 7,757,185 B2 | 7/2010 | Paquette | |
| 7,840,490 B1 | 11/2010 | Sellers | |
| 7,877,783 B1 | 1/2011 | Cline | |
| 7,890,869 B1 | 2/2011 | Mayer | |
| 7,966,398 B2 | 6/2011 | Wiles, Jr. | |
| 8,060,396 B1 | 11/2011 | Bessler | |
| 8,196,210 B2 | 6/2012 | Sterin | |
| 8,321,948 B2 | 11/2012 | Robinson | |
| 8,407,669 B2 | 3/2013 | Yee | |
| 8,468,457 B1 | 6/2013 | Kay | |
| 8,554,750 B2 | 10/2013 | Rangarajan | |
| 8,595,647 B2 | 11/2013 | Sabin | |
| 8,620,818 B2 | 12/2013 | Hughes | |
| 8,646,093 B2 | 2/2014 | Myers | |
| 8,674,992 B2 | 3/2014 | Poston | |
| 8,725,647 B2 | 5/2014 | Disciascio | |
| 9,053,460 B2 | 6/2015 | Gilbert | |
| 10,673,963 B1 | 6/2020 | Feiguine | |
| 10,749,943 B1 | 8/2020 | Feiguine | |
| 10,771,344 B2 | 9/2020 | Bitterfeld | |
| 10,824,650 B2 | 11/2020 | Bar Oz | |
| 10,944,654 B2 | 3/2021 | Rimar | |
| 10,999,152 B1 | 5/2021 | Bar Oz | |
| 11,025,481 B1 | 6/2021 | Louca | |
| 11,089,115 B2 | 8/2021 | Garty | |
| 11,095,506 B1 | 8/2021 | Erblat | |
| 11,275,580 B2 | 3/2022 | Tamir | |
| 11,277,475 B1 | 3/2022 | Tal | |
| 11,281,442 B1 | 3/2022 | Tal | |
| 11,296,922 B2 | 4/2022 | Leibkowiz | |
| 11,301,503 B2 | 4/2022 | Burli | |
| 11,379,089 B2 | 7/2022 | Goswami | |
| 11,451,573 B2 | 9/2022 | Waplington | |
| 11,470,107 B2 | 10/2022 | Waplington | |
| 11,632,303 B2 | 4/2023 | Bitterfeld | |
| 11,640,369 B2 | 5/2023 | Bhogle | |
| 2002/0116340 A1 | 8/2002 | Hellberg | |
| 2002/0133584 A1 | 9/2002 | Greuel | |
| 2002/0158969 A1 | 10/2002 | Gupta | |
| 2003/0118087 A1 | 6/2003 | Goldthwaite | |
| 2003/0200293 A1 | 10/2003 | Fearn | |
| 2005/0015217 A1 | 1/2005 | Weidl | |
| 2005/0091356 A1 | 4/2005 | Izzo | |
| 2006/0026453 A1 | 2/2006 | Frost | |
| 2006/0095461 A1 | 5/2006 | Raymond | |
| 2006/0161889 A1* | 7/2006 | Stabb | G06F 9/45512 |
| | | | 717/113 |
| 2006/0179058 A1 | 8/2006 | Bram | |
| 2006/0293942 A1 | 12/2006 | Chaddha | |
| 2007/0033279 A1 | 2/2007 | Battat | |
| 2007/0050469 A1* | 3/2007 | Gupta | G06F 9/451 |
| | | | 709/217 |
| 2007/0162875 A1* | 7/2007 | Paquette | G06F 3/0238 |
| | | | 715/847 |
| 2007/0188494 A1 | 8/2007 | Agutter | |
| 2007/0288389 A1 | 12/2007 | Vaughan | |
| 2008/0133289 A1 | 6/2008 | Armour | |
| 2008/0140601 A1* | 6/2008 | Mital | G06N 5/025 |
| | | | 706/48 |
| 2008/0148253 A1 | 6/2008 | Badwe | |
| 2008/0319779 A1 | 12/2008 | Hughes | |
| 2009/0088875 A1 | 4/2009 | Baier | |
| 2009/0228984 A1 | 9/2009 | Sterin | |
| 2010/0110932 A1 | 5/2010 | Doran | |
| 2010/0287507 A1* | 11/2010 | Paquette | G06F 3/0238 |
| | | | 715/827 |
| 2010/0333034 A1 | 12/2010 | Carlson | |
| 2011/0066983 A1 | 3/2011 | Kim | |
| 2013/0067390 A1 | 3/2013 | Kwiatkowski | |
| 2013/0067398 A1 | 3/2013 | Pittappilly | |
| 2013/0311948 A1 | 11/2013 | McCoy | |
| 2014/0082517 A1* | 3/2014 | Vasudev | G06F 3/0489 |
| | | | 715/747 |
| 2014/0096086 A1* | 4/2014 | Cho | H04N 1/00474 |
| | | | 715/847 |
| 2014/0173521 A1 | 6/2014 | Mayor | |
| 2015/0199109 A1* | 7/2015 | Lee | G06F 3/04886 |
| | | | 715/760 |
| 2018/0123940 A1 | 5/2018 | Rimar | |
| 2019/0073257 A1 | 3/2019 | Dasgupta | |
| 2019/0104398 A1 | 4/2019 | Owen | |
| 2019/0235726 A1* | 8/2019 | Vasudev | G06F 3/0489 |

(56) References Cited

U.S. PATENT DOCUMENTS

| | | | |
|---|---|---|---|
| 2020/0050689 | A1 | 2/2020 | Tal |
| 2020/0204443 | A1 | 6/2020 | Bar Oz |
| 2020/0285319 | A1 | 9/2020 | Sirpal |
| 2020/0301678 | A1 | 9/2020 | Burman |
| 2021/0194764 | A1 | 6/2021 | Badyan |
| 2021/0365181 | A1 | 11/2021 | Duggan |
| 2022/0029886 | A1 | 1/2022 | Hameiri |
| 2022/0269406 | A1* | 8/2022 | Aggrawal ........... G06F 3/04892 |

FOREIGN PATENT DOCUMENTS

| | | | |
|---|---|---|---|
| JP | 2012084018 | A | 4/2012 |
| WO | 9934285 | W | 7/1999 |
| WO | 0052559 | W | 9/2000 |
| WO | 0179970 | W | 10/2001 |

* cited by examiner

610

620

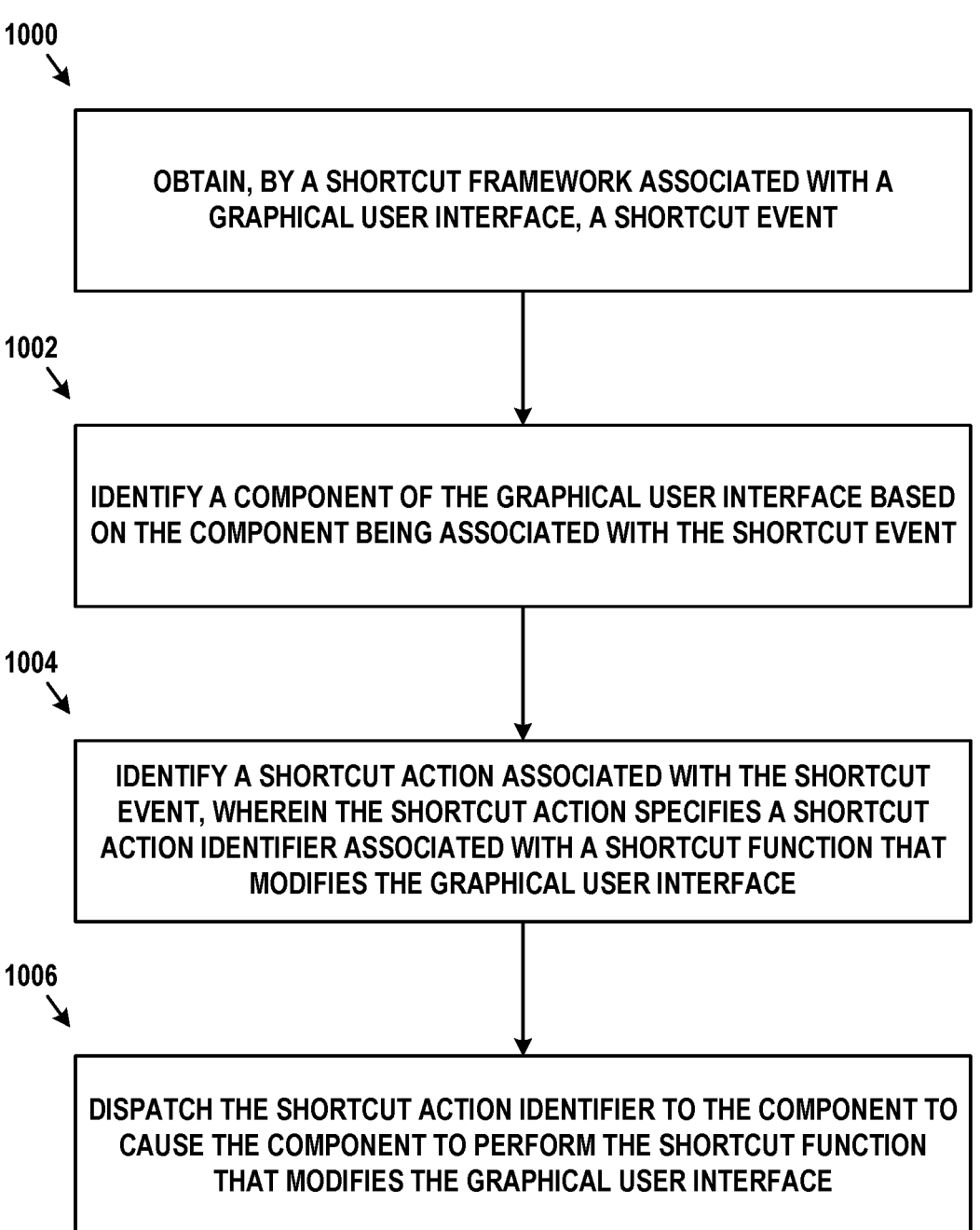

1000

OBTAIN, BY A SHORTCUT FRAMEWORK ASSOCIATED WITH A
GRAPHICAL USER INTERFACE, A SHORTCUT EVENT

1002

IDENTIFY A COMPONENT OF THE GRAPHICAL USER INTERFACE BASED
ON THE COMPONENT BEING ASSOCIATED WITH THE SHORTCUT EVENT

1004

IDENTIFY A SHORTCUT ACTION ASSOCIATED WITH THE SHORTCUT
EVENT, WHEREIN THE SHORTCUT ACTION SPECIFIES A SHORTCUT
ACTION IDENTIFIER ASSOCIATED WITH A SHORTCUT FUNCTION THAT
MODIFIES THE GRAPHICAL USER INTERFACE

1006

DISPATCH THE SHORTCUT ACTION IDENTIFIER TO THE COMPONENT TO
CAUSE THE COMPONENT TO PERFORM THE SHORTCUT FUNCTION
THAT MODIFIES THE GRAPHICAL USER INTERFACE

FIG. 10

SHORTCUT FRAMEWORK FOR SUPPORTING FLEXIBLE USER INTERFACE FEATURES

BACKGROUND

Keyboard shortcuts can enable navigation within a graphical user interface, such as invoking display of a graphical component or moving between graphical components. These shortcut capabilities are typically hard-coded into the components themselves on a per-component or per-screen basis. This rigid approach can lead to different user interface screens or experiences that employ the same shortcuts for vastly different functions. As a consequence, user interfaces within the same application or suite of applications can behave in an inconsistent fashion, thus reducing the utility of the application(s). Moreover, the inconsistent behaviors of the user interfaces can lead to more undesired interactions between a user and the user interfaces, such as when the user unintentionally selects a component. Further, such user interfaces exhibit a lack of flexibility in how shortcuts are defined, as it may not be possible for a user to customize the shortcuts to their own needs or for a developer to easily define or modify shortcut behavior and functionality.

SUMMARY

Various implementations disclosed herein include a flexible and configurable shortcut framework that applies to keyboard shortcuts as well as other types of shortcuts associated with user interface or system events. The shortcut framework separates shortcut events (events that trigger shortcuts such as keystrokes) from shortcut actions (what happens when a shortcut is triggered). Further, the definitions of and relationships between shortcut events and shortcut actions are stored in a data model that is distinct from the components. Thus, shortcuts can be mapped to different events and actions without having to redesign components. This results in the ability to rapidly define and modify graphical user interfaces with consistent shortcut behavior in a low-code/no-code fashion.

Accordingly, a first example embodiment may involve: obtaining, by a shortcut framework associated with a graphical user interface, a shortcut event; identifying a component of the graphical user interface based on the component being associated with the shortcut event; identifying a shortcut action associated with the shortcut event, wherein the shortcut action specifies a shortcut action identifier associated with a shortcut function that modifies the graphical user interface; and dispatching the shortcut action identifier to the component to cause the component to perform the shortcut function that modifies the graphical user interface.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 10 is a flow chart, in accordance with example embodiments.

DETAILED DESCRIPTION

Figure 1:
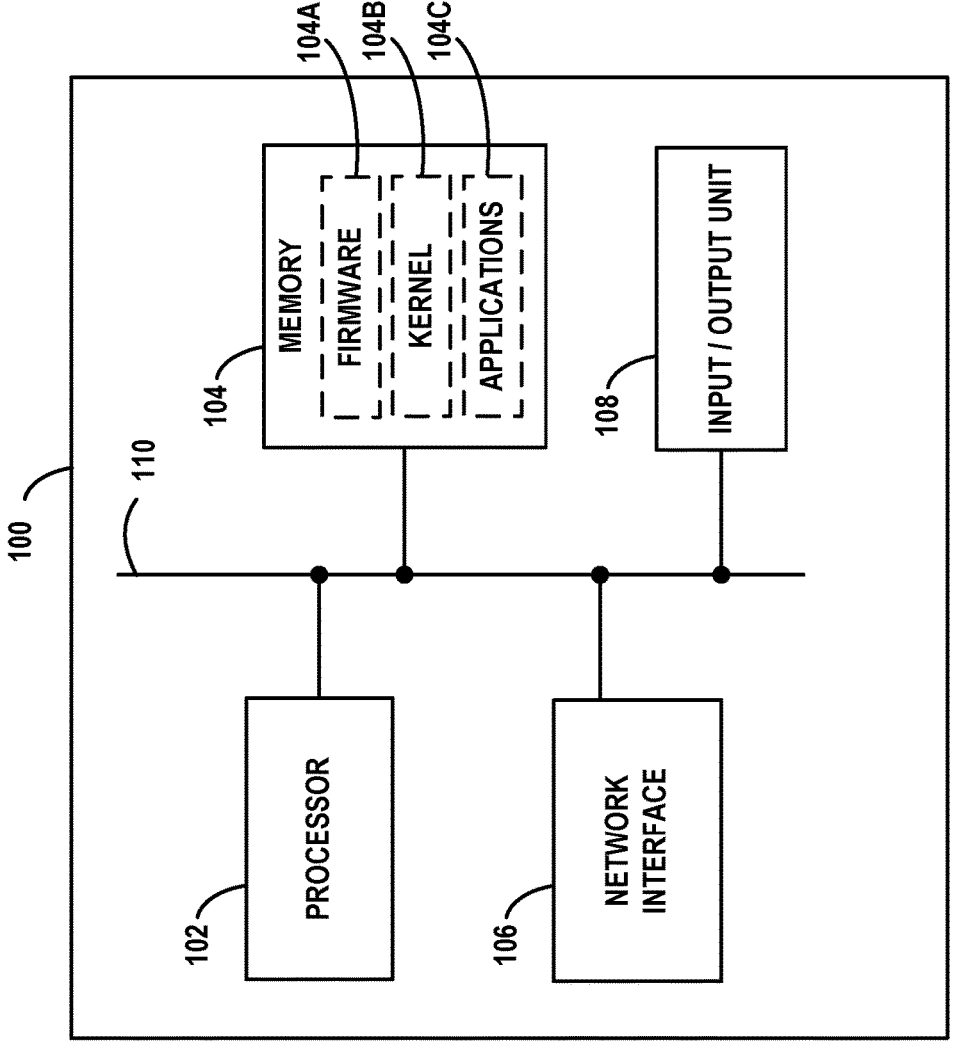
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
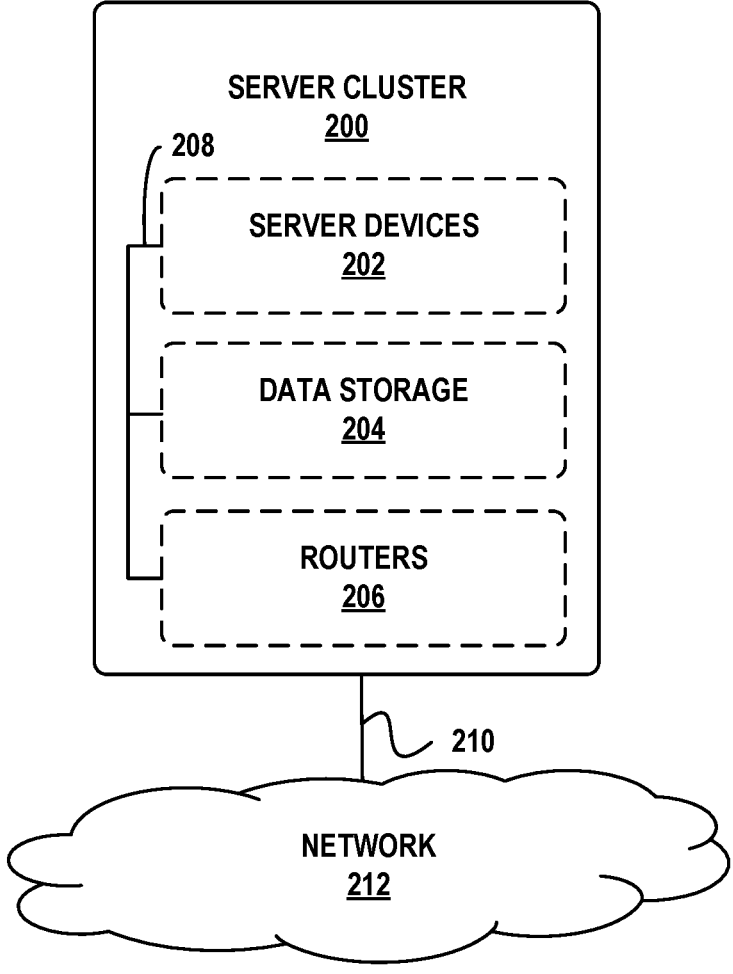
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
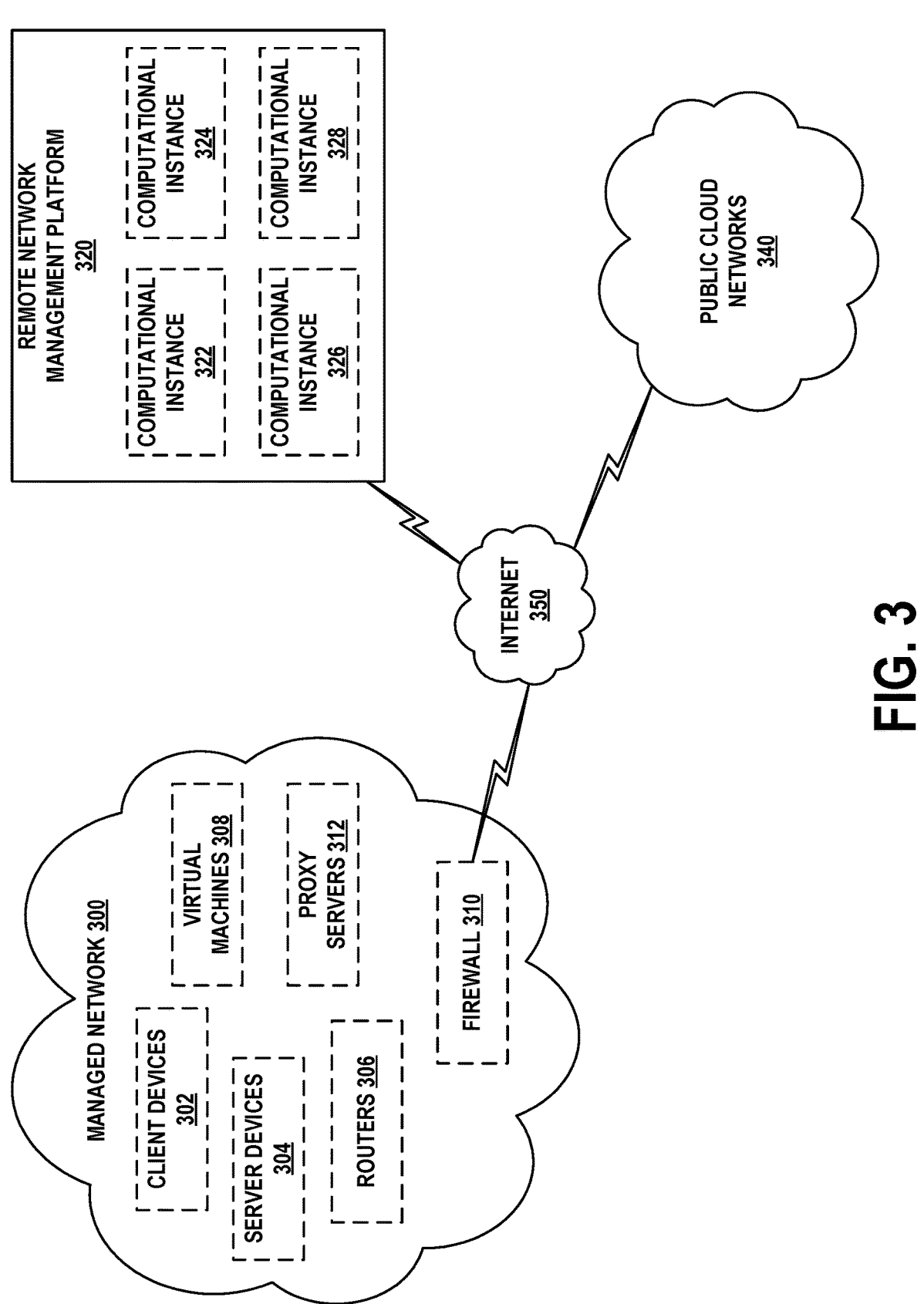
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
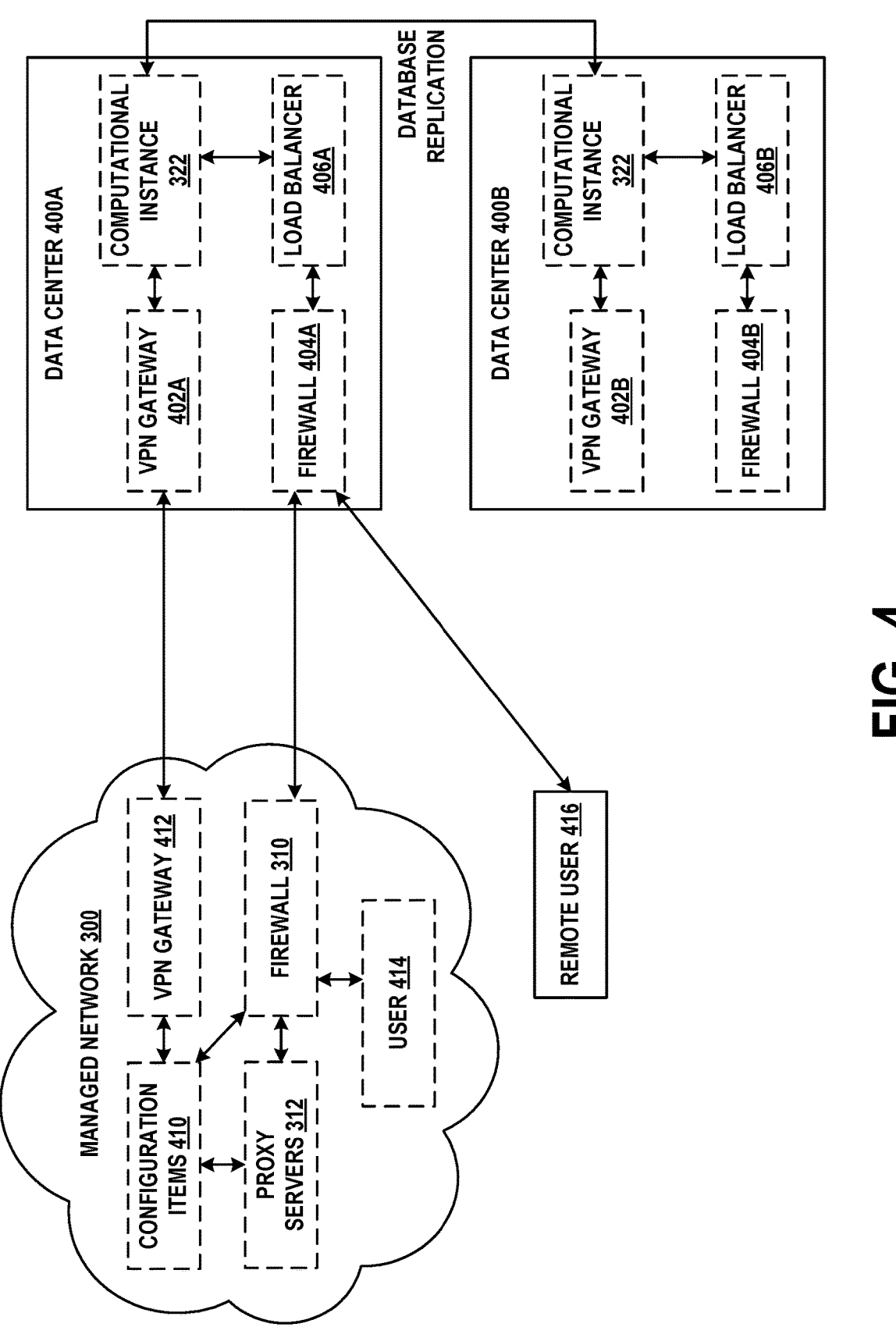
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
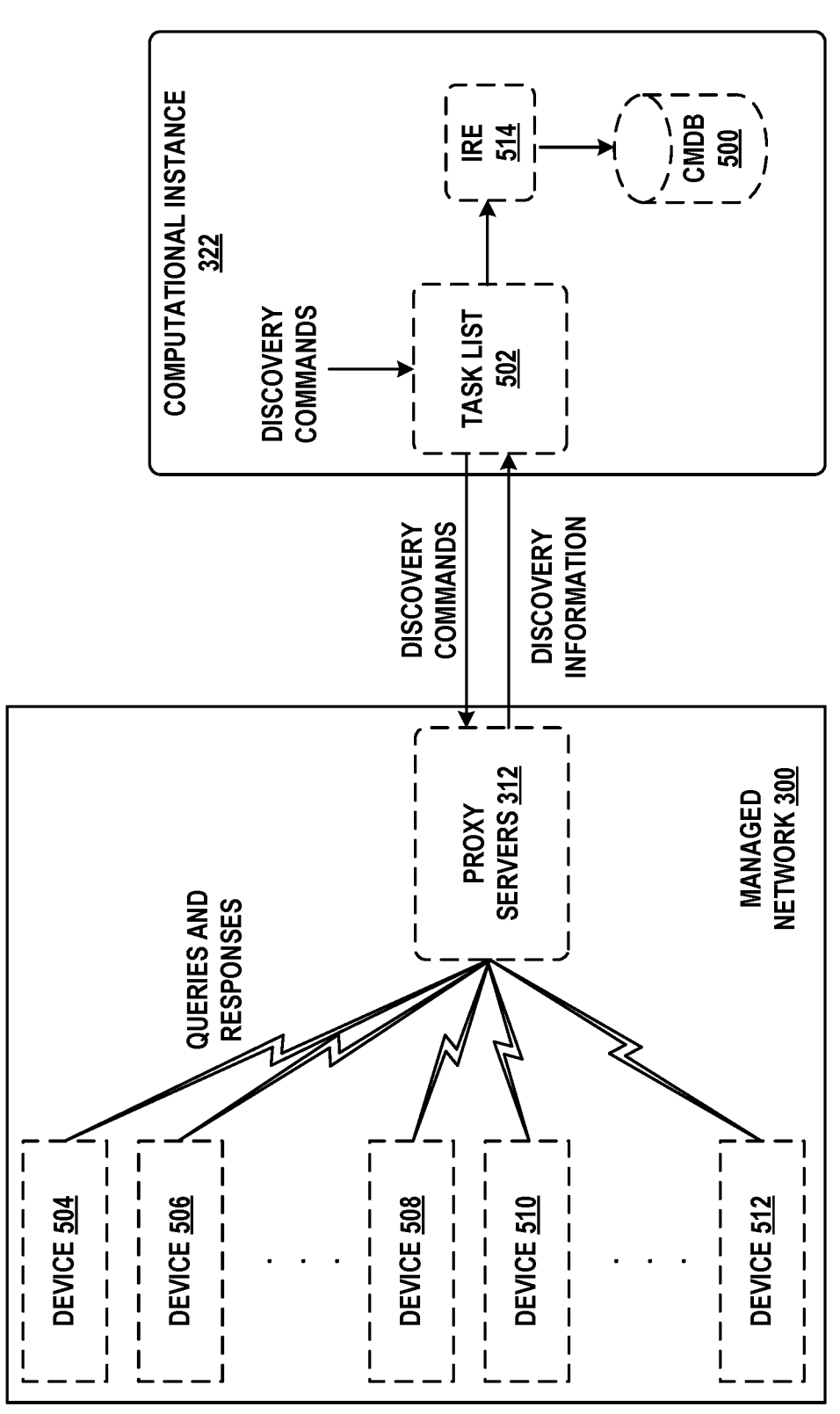
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. USER INTERFACE NAVIGATION

Graphical user interfaces consist of one or more screens, with each screen including a set of components. Such components may include buttons, non-editable text labels, text boxes (e.g., for text entry by a user), check boxes, radio buttons, drop-down menus or lists, list boxes with selectable list items, sliders, panels (sections of an interface that may contain other components), progress indicators (e.g., progress bars), menu bars, tool bars, tabbed controls, dialog boxes, scroll bars, image viewers (e.g., a container to display an image or icon), tooltips (e.g., a pop-up box that provides context information when hovered over or actuated), separators, and so on. Some components may serve as containers for other components (e.g., panels as noted above or list boxes containing list items).

This list of components is not comprehensive. More or fewer types of components may be used in various graphical user interfaces. Further, different names may be used to refer to these components (e.g., a panel may also be called a pane, a container, or a box).

Each of these components may have a size (e.g., dimensions in pixels, inches, or centimeters), a position (e.g., defined by the top left corner of the component in either relative or absolute coordinates), one or more colors (e.g., a background color and a foreground color), a style (e.g., a font, font size, and/or or line weight), a visibility (e.g., shown or hidden), validation rules (e.g., for text entry), and/or custom event handling routines or scripts. Other components may have additional characteristics that are hard-coded or configurable.

When arranged on a graphical user interface, these components inherently exhibit a hierarchical structure. For example, the hierarchy may be tree-like, with the screen itself being the root node of the tree and the components being arranged as children of the root node or of other components. Such a tree-like hierarchy can be helpful when representing the components in a data structure, as the data structure encodes the visual layout of the components with respect to one another.

In general, a component is a reusable and modular element that can be embedded into a web-based interface or custom application. It is typically defined using web technologies such as XML, HTML, cascading style sheets (CSS), and/or JavaScript. Components provide a way to encapsulate and package functionality, making it easier to build and maintain complex user interfaces. In addition to being reusable (thus promoting interface consistency and development efficiency), components can be customized, interactively respond to actions or events, and bind to units of data in a data model (e.g., a database) to display and automatically update this data.

Figure 6A:
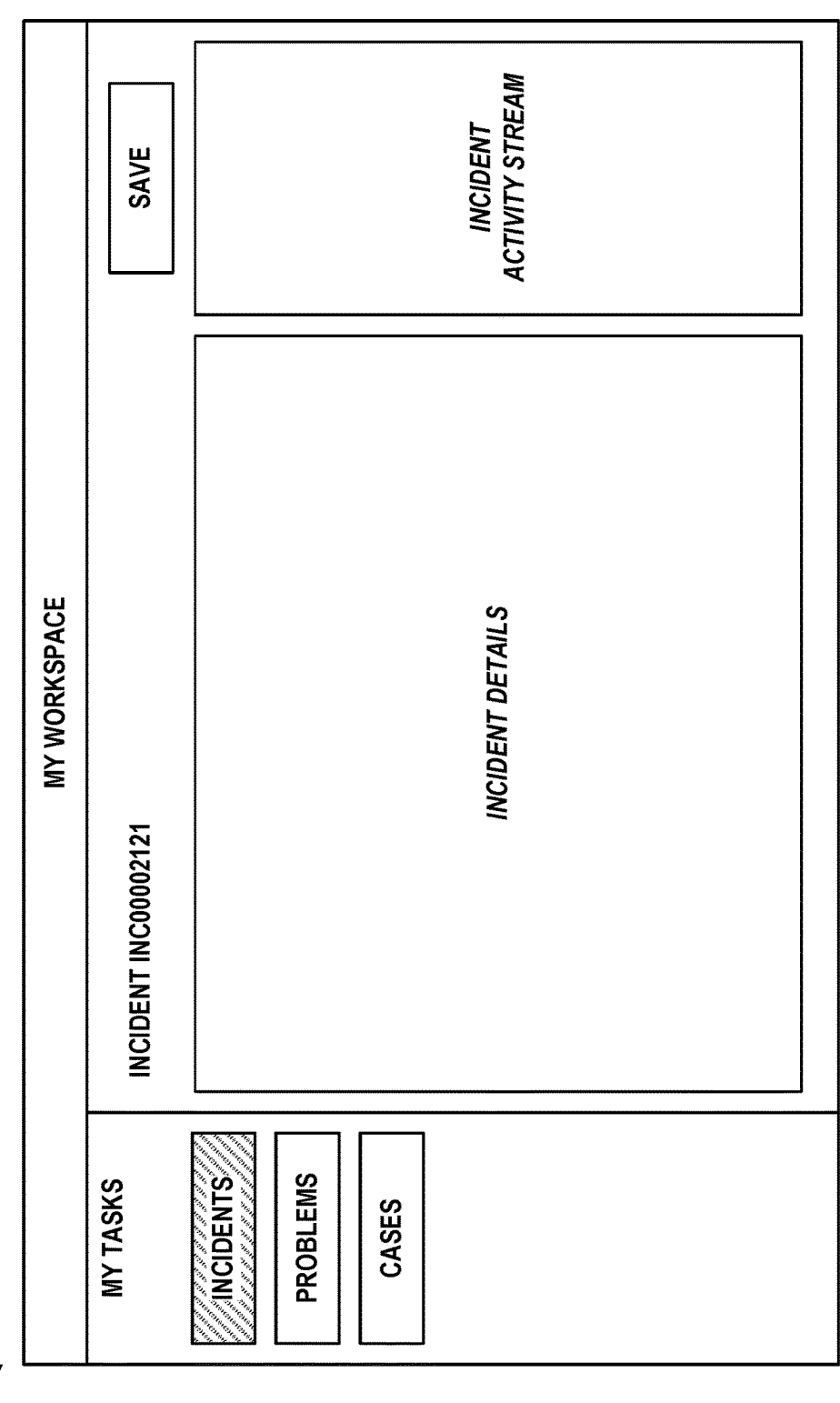
FIGS. 6A, 6B, and 6C depict a graphical user interface, the components thereof, and a tree-like representation thereof, in accordance with example embodiments.
Figure 6B:
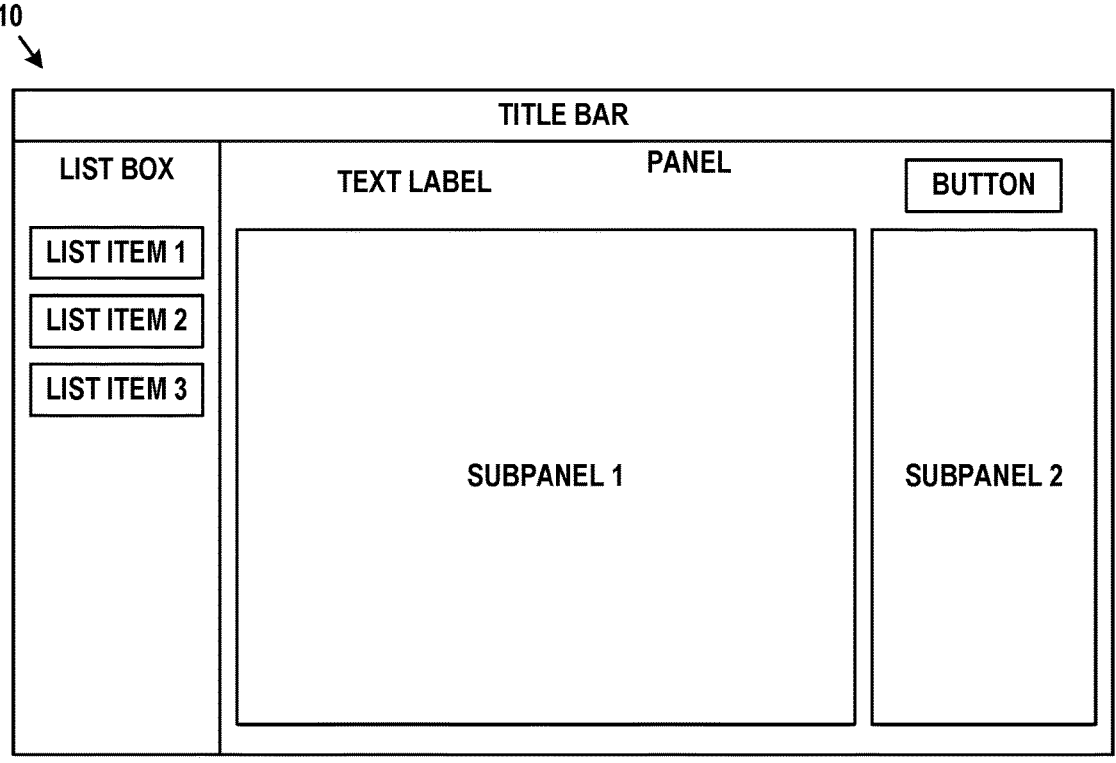
Figure 6C:
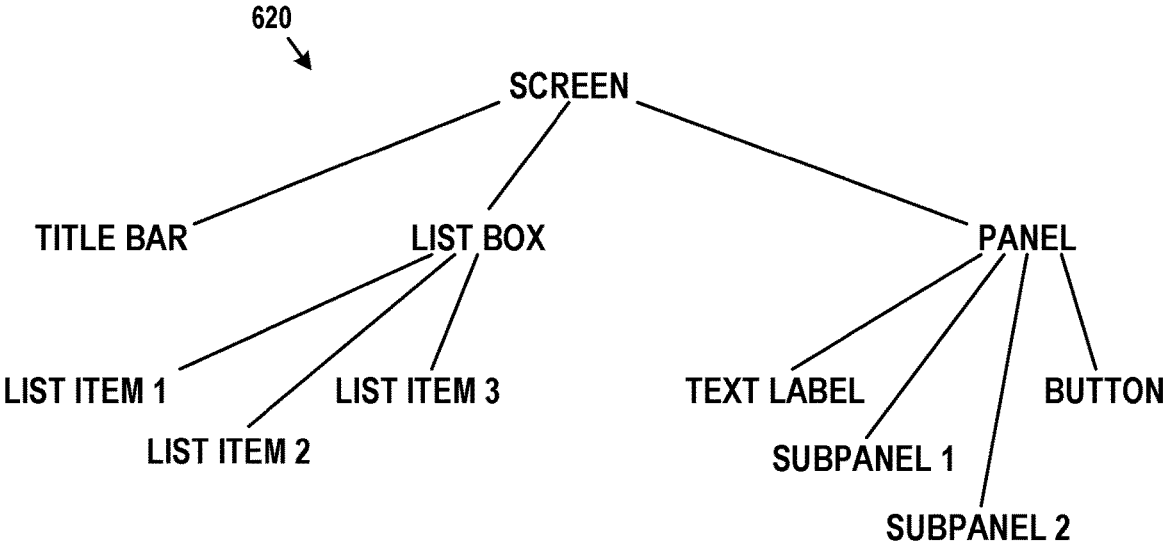

An example of a graphical user interface employing components is shown in FIGS. 6A, 6B, and 6C. This example involves the display of information relating to an incident by an incident management application. Such an incident, in the context of IT service management, refers to a record of an unplanned interruption, reduction in quality, or failure of an IT service that disrupts or has the potential to disrupt normal system and/or network operations. The incident management application helps users manage and resolve incidents with functions including incident recording and tracking, prioritization, assignment to an agent and escalation, reporting, and analytics. Nonetheless, this example is merely for purposes of illustration and other types of graphical user interfaces relating to other types of applications may benefit from the embodiments herein.

In FIG. 6A, example graphical user interface 600 is shown. This graphical user interface includes a title bar ("my workspace"), a list box with list items ("my tasks"), and a panel (to the right of the list box and below the title bar). The panel contains a text label ("Incident INC00002121"), a button ("save"), and two subpanels (one for incident details and the other for an incident activity stream). The "incidents" list item is selected, which causes the panel's contents to be incident-related.

FIG. 6B depicts representation 610 of graphical user interface 600. Representation 610 has the same layout as graphical user interface 600 but labels each component with its component type. FIG. 6C depicts tree-like structure 620 for graphical user interface 600 using the component types named in representation 610. Tree-like structure 620 specifies the hierarchy of the components of graphical user interface 600 and reflects how these components may be arranged in a data structure.

A user can navigate through such a graphical user interface by using any of a number of input modalities, such as by keyboard, pointer (e.g., mouse), touch-based interface, audio command (e.g., voice command), and so on. In general, graphical user interface navigation is event driven, where events can be generated by way of these input modalities (e.g., a keystroke is intercepted and generates an event that is delivered to the graphical user interface controller), or are non-input events (e.g., a timer-related event such as a timer expiry causes part of a graphical user interface to change color, or the result of a remote application programming interface call causes text to be automatically populated in a text box).

A graphical user interface may have a focus, the focus being the component that is currently selected or live for the user and ready to receive input or otherwise be manipulated. For instance, if the user selects a text box component, the text box may be highlighted or emphasized in some fashion to indicate that it has the focus. Then, any text entered by the user would be placed into this text box until the focus changes to a different component (or until the text box is full). It is possible for a graphical user interface to have no focus (e.g., when it is initially loaded). It is also possible to define declarative action shortcuts (see below) that have a set functions regardless of focus.

The description herein centers on navigational shortcuts for a graphical user interface; namely, keyboard shortcuts for purposes of simplicity. Nonetheless, shortcuts using other types of input modalities may be used, such as actuation of certain mouse inputs or combinations thereof, actuation of certain video game controller inputs or combinations thereof, voice commands and other auditory shortcuts, touchscreen input, stylus-based input, optical input, gesture-based input, motion sensor input, proximity sensor input, and so on.

Keyboard shortcuts are commonly implemented within components to carry out navigational tasks, such as cycling the focus through components (e.g., by repeated actuations of the tab keystroke) or saving data that was entered into the graphical user interface (e.g., by actuation of the ctrl+s keystroke). Other keyboard shortcuts may invoke other functions, such as refreshing a component, opening a dialog box, cutting and pasting text and/or other content, and so on. Such shortcuts, when properly designed, are convenient and powerful techniques for users to easily and rapidly navigating a graphical user interface.

The keystrokes used for keyboard shortcuts may involve the actuation of just a single key (e.g., tab) or a combination of such a key with one or more modifier keys (e.g., shift, ctrl, command, and/or alt). Thus, for example, the keystroke ctrl+alt+del involves the user holding down the control and alt keys while actuating the delete key. A list of common keyboard shortcuts for various functions include: copy: ctrl+c, paste: ctrl+v, cut: ctrl+x, undo: ctrl+Z, redo: ctrl+y or ctrl+shift+z, save: ctrl+s, print: ctrl+p, select all: ctrl+a, find: ctrl+f, and close window: alt+F4 or command+w. These are just a few examples, and different applications may have their own set of shortcuts.

For sake of descriptiveness, shortcuts may be considered to fall into one of several categories based on the type of task performed by the shortcuts. An action shortcut changes the state of one or more components in some manner, such as expanding or hiding a drop-down list, causing a tooltip to pop up, and so on. A focus shortcut changes the focus of the graphical user interface from one component to another (or from no focus to focus on a specific component).

Action shortcuts can be further broken down into global action shortcuts, component action shortcuts, and declarative action shortcuts. Global action shortcuts are available regardless of focus unless the component on which the focus currently lies has overridden this shortcut. Often, global action shortcuts are platform-wide and exhibit the same or similar behavior across applications. Component action shortcuts are specific to and only in effect when focus is within a specific component. Declarative action shortcuts execute a pre-defined unit of program code when invoked. For example, ctrl+s may be defined as a declarative action shortcut to save any unsaved data entered into a graphical user interface regardless of focus.

The actions taken for an overridden shortcut is selected based on the focus and/or the type of shortcut. This involves, when a shortcut is received, examining the component shortcuts starting with the component currently in focus (the most specifically-scoped component) and moving up the hierarchy of components until a matching shortcut definition is found (gradually generalizing the scope). If no match is found, the received shortcut may have no effect. Turning to tree-like structure 620 of FIG. 6C, suppose that a shortcut of ctrl+c is received and that the focus is on the "list item 2" component. If there is no component action shortcut defined for ctrl+c, it parent "list box" component is checked. If there is no component action shortcut defined in the "list box" component for ctrl+c, its parent "screen" component is checked.

In other words, the component with the most specific scope relative to the focus will be checked first, then tree-like structure 620 is traversed iteratively upward toward its root. When a match is found, the action associated with the matching component action shortcut is performed. This means that if both the "list item 2" component and the "list box" component define a shortcut for ctrl+c, the action for the "list box" component will not be performed when the focus is on the "list item 2" component.

Based on configuration, component action shortcuts may override global action shortcuts, and declarative action shortcuts may override both component action and global action shortcuts. However, other overriding arrangements are possible (e.g., global action shortcuts overriding component action shortcuts).

Further, certain focus shortcuts may be configured to highlight, manipulate (e.g., expand or collapse), or cycle the focus through a subset of components on a screen that are deemed to be important or otherwise worthy of attention. This subset might be the components that are most likely to be of interest to the user, or the components with which the user is most likely interact (e.g., to enter text).

Doing so reduces the amount of time a user needs to spend navigating through the graphical user interface before they get to the components that they are most likely to use. As an example, suppose that of 20 input components on a graphical user interface, most of the time the user only needs to interact with 5. Rather than using a default shortcut (e.g., tab) to cycle through the 20 components, a new shortcut (e.g., shift+tab) can be defined to cycle through just the 5 that are most likely to be used. This makes the graphical user interface easier and faster to navigate.

Figure 7A:
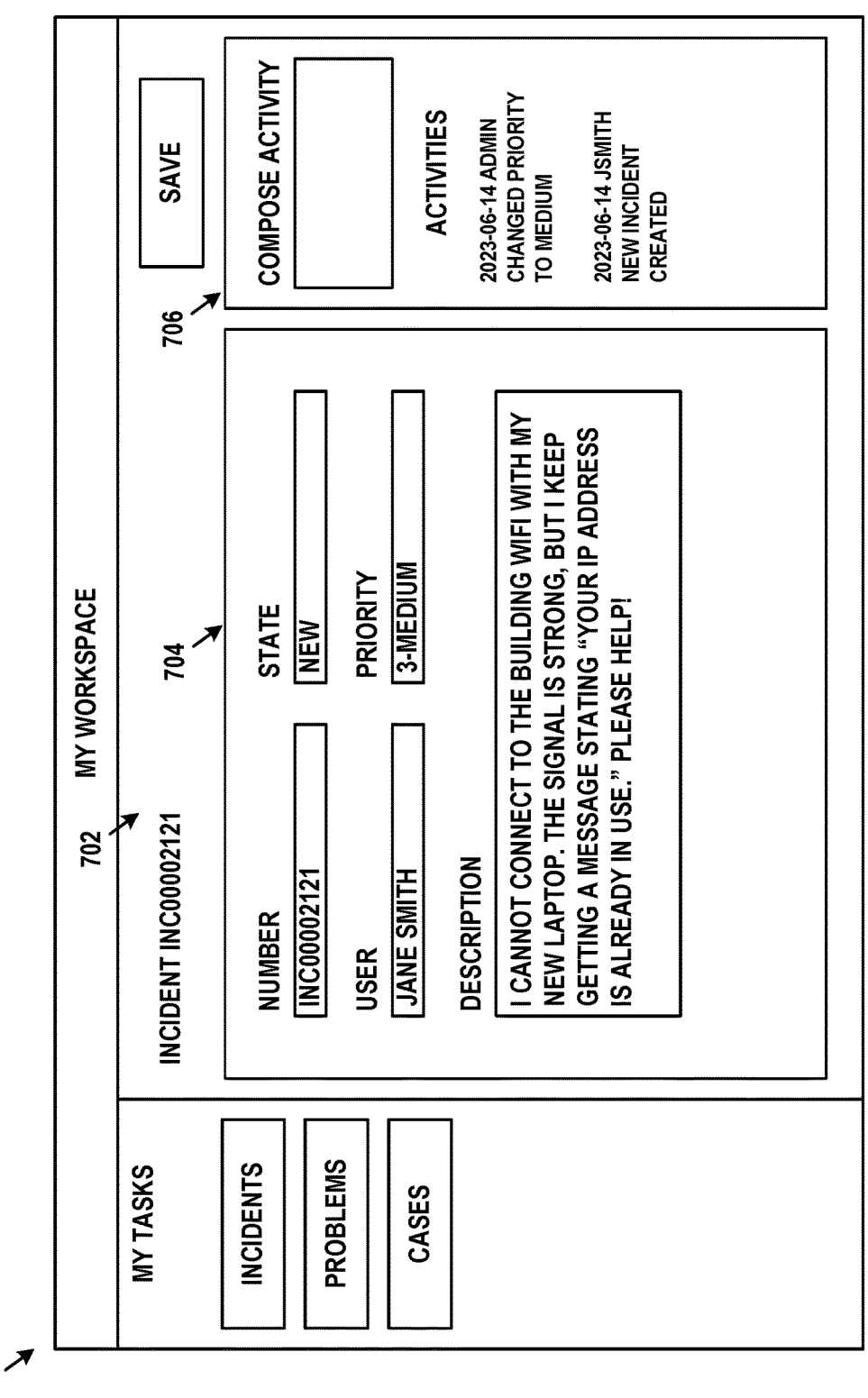
FIG. 7A depicts a graphical user interface with various components, in accordance with example embodiments.
Figure 7B:
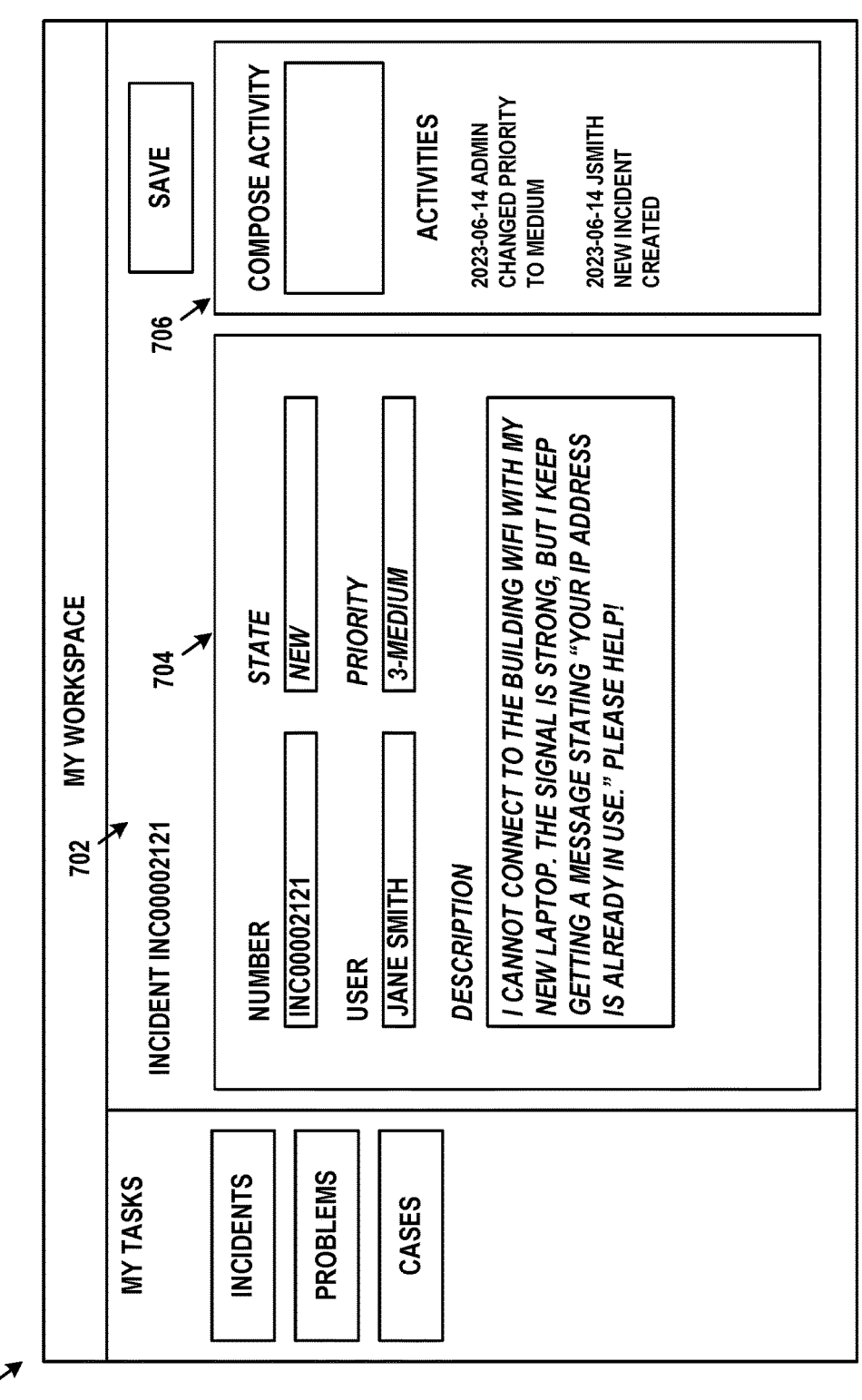
FIG. 7B depicts the graphical user interface of FIG. 7A with certain components highlighted by way of a shortcut, in accordance with example embodiments.
Figure 7C:
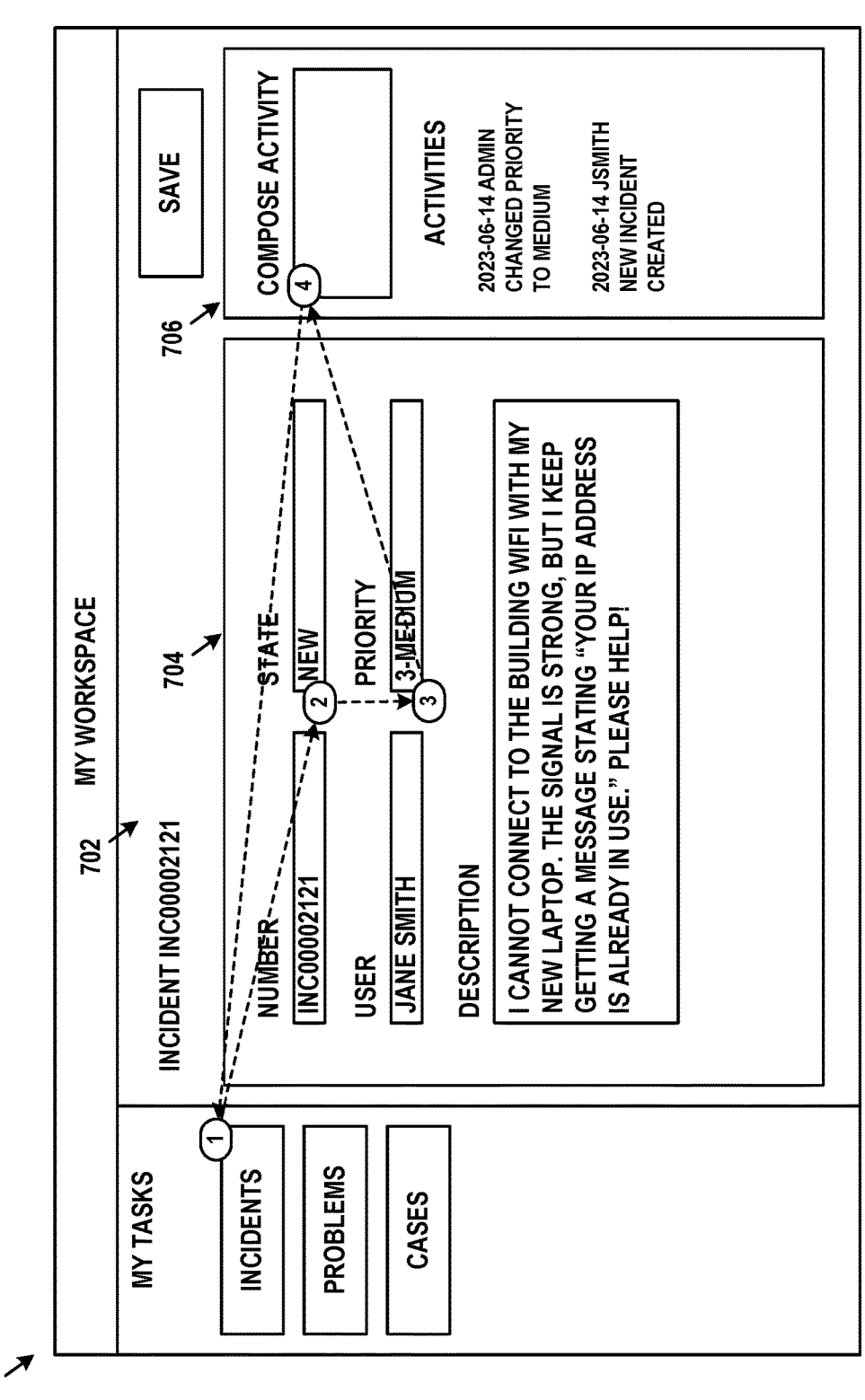
FIG. 7C depicts the graphical user interface of FIG. 7A with the focus capable of switching between certain components by way of a shortcut, in accordance with example embodiments.

FIGS. 7A, 7B, and 7C provides examples. FIG. 7A depicts a graphical user interface 700 based on the layout of graphical user interface 600. Here, panel 702 includes subpanels 704 and 706. Subpanel 704 includes components with information related to an IT incident, such as the incident's number, its state, the user impacts, it priority, and a description. Subpanel 706 includes a text box component in which to compose (write and submit) activities related to this incident, as well as a chronological or reverse chronological list component of past activities.

FIG. 7B depicts graphical user interface 710, which is identical to graphical user interface 700, except that the state, priority, and description components are emphasized. The emphasis shown in FIG. 7B is that the content of these components are italicized, but other forms of emphasis or highlighting may be used (e.g., changing the colors, shading, or contrast of these components). The transition from graphical user interface 700 (with no emphasized fields) to graphical user interface 710 (with emphasized fields) may be due to actuation of a shortcut (such as a keyboard shortcut). Doing so directs the attention of the user to the components that are deemed most important in this case.

FIG. 7C depicts graphical user interface 720, which is identical to graphical user interface 700, except that the incidents component, the state component, the priority component, and the compose activity component are annotated with the numbers 1, 2, 3, and 4, respectively. Note that this annotation is for purposes of illustration and would likely not appear on the graphical user interface. The focus of graphical user interface 720 can cycle between the annotated components (e.g., in order of their numbers) with repeated actuations of a pre-defined shortcut.

For example, actuation of the shift+tab keystroke may change the focus to the nearest annotated component (in terms of the hierarchy of graphical user interface 720 or some other ordering). In other words, the focus of graphical user interface 720 may cycle through the annotated components (e.g., from the incidents component, to the state component, to the priority component, to the compose activity component, to the incidents component, and so on, perhaps in accordance with a depth-first traversal of the hierarchy).

Given this, it is desirable for a platform, such as remote network management platform 320, to support shortcuts in a comprehensive yet flexible manner. A shortcut framework should allow for consistency across applications and user experiences, but also be customizable down to the component level. Doing so makes for simpler and more intuitive navigation for users, especially users with accessibility concerns. Also, this flexible framework facilitates rapid graphical user interface design, development, and maintenance by eliminating the need to hard-code specific shortcut behavior into individual components.

VII. EXAMPLE SHORTCUT DATA MODEL AND USES THEREOF

The shortcut framework described herein may be based on a configurable and flexible data model. The shortcut framework may be implemented as some combination of program code and data that is loaded with or as part of the root component (e.g., the screen or page). Such a shortcut framework may receive or be notified of events and instruct various components of a graphical user interface to behave according to functions defined for these events. The data model may be separate from the shortcut framework, and implemented in one or more tables of a database for example.

Figure 8:
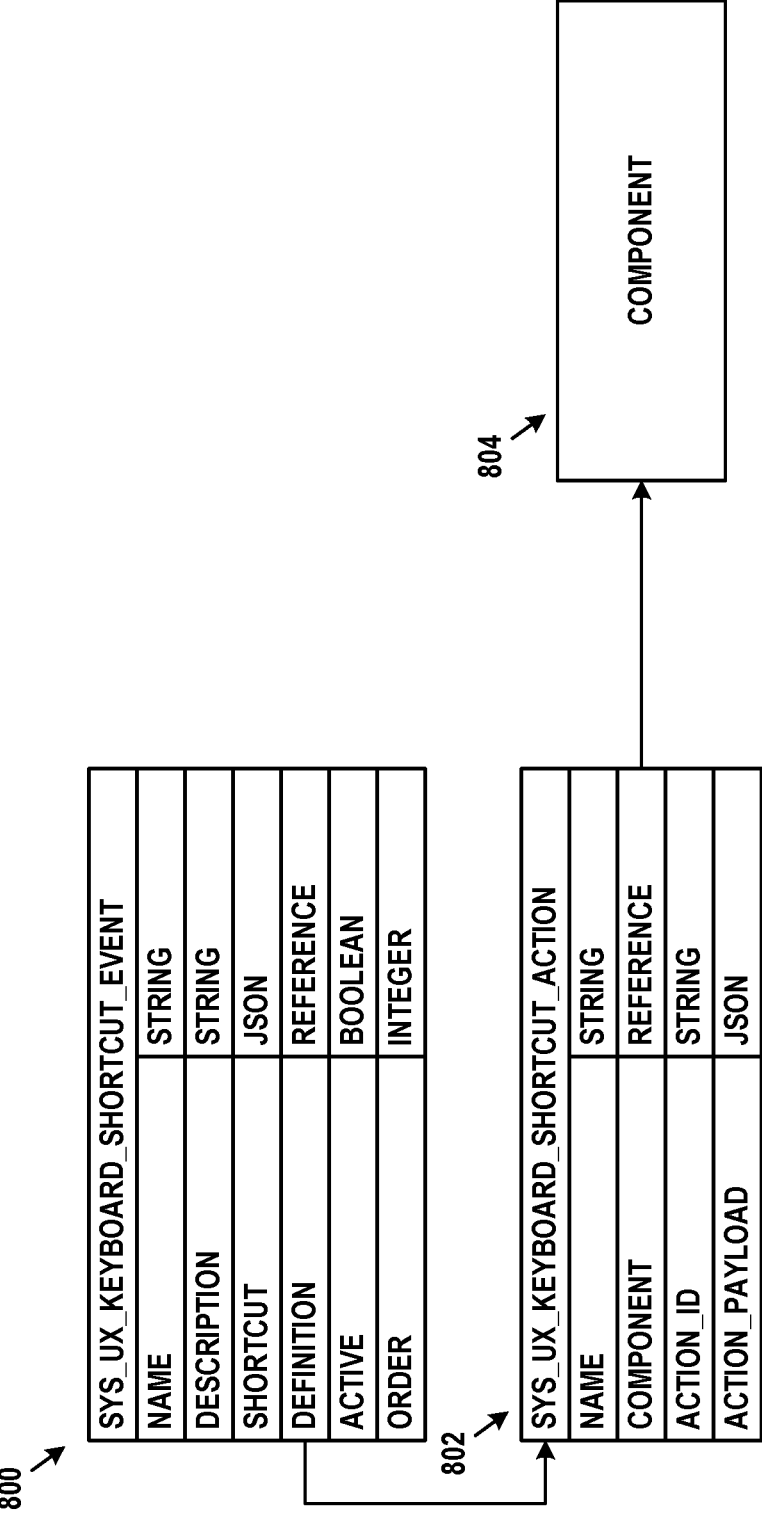
FIG. 8 depicts a data model, in accordance with example embodiments.

An example shortcut data model is shown in FIG. 8. This data model separates shortcut events (events that trigger shortcuts such as keystrokes) from shortcut actions (what happens when a shortcut is triggered). Doing so allows flexible and rapid configuration of shortcut events and shortcut actions. For example, the shortcut action for a given shortcut event can be swapped by editing the references between data objects in the data model, and (unlike other techniques) without editing any components.

In FIG. 8, data object 800 specifies a shortcut event and how it is to be used. Data object 802 defines a shortcut action for the shortcut event of data object 800. Data object 804 represents a component of a graphical user interface that is impacted by the shortcut action of data object 802. Each of data objects 800, 802, and 804 may be stored as entries in different tables of a relational database, for example.

Data object 800 is of the sys_ux_keyboard_shortcut_event type and may be primarily used to specify the shortcut event (e.g., a keystroke). Data object 800 may have a name field and a description field, both in the form of text strings, which respectively name and describe the shortcut event. Data object 800 may also have a shortcut field in the form of a JSON object. This JSON object may define the event (e.g., a keystroke). An example JSON object for the keystroke of ctrl+x might be {"key": "x", "ctrl": true}. Data object 800 may further have a definition field, which can be a reference to a data object of the sys_ux_keyboard_shortcut_action type (in this example, data object 802). Data object 800 may additionally have an active field in the form of a Boolean value. This field may be used to indicate whether the shortcut is active (usable) or not active (unusable). Data object 800 may also have an order field that is used to determine which shortcut event has precedence when multiple shortcut events define the same shortcut (e.g., have the same shortcut field) and/or refer to the same sys_ux_keyboard_shortcut_action data object.

As noted, data object 802 is of the sys_ux_keyboard_shortcut_action type and may be primarily used to define the component affected by the shortcut and the action taken when the shortcut is triggered. Data object 802 may have a name field, in the form of a text string, which names the shortcut action. Data object 802 may also have a component field that is a reference to a component that can be placed in a graphical user interface (in this case, component 804). Data object 802 may further have an action_id field, in the form of a text string, which specifies the shortcut function to be performed by the component. This function may be one of possibly several defined in the component referred to by the component field. Data object 802 may additionally have an action_payload field, in the form of a JSON object, which defines data that is passed to the component when the shortcut is triggered.

Notably, the type names of "sys_ux_keyboard_shortcut_event" and "sys_ux_keyboard_shortcut_action" are merely for purposes of illustration. Other type names could be used. Moreover, different data model arrangements can be used to achieve the features described herein.

Figure 9A:
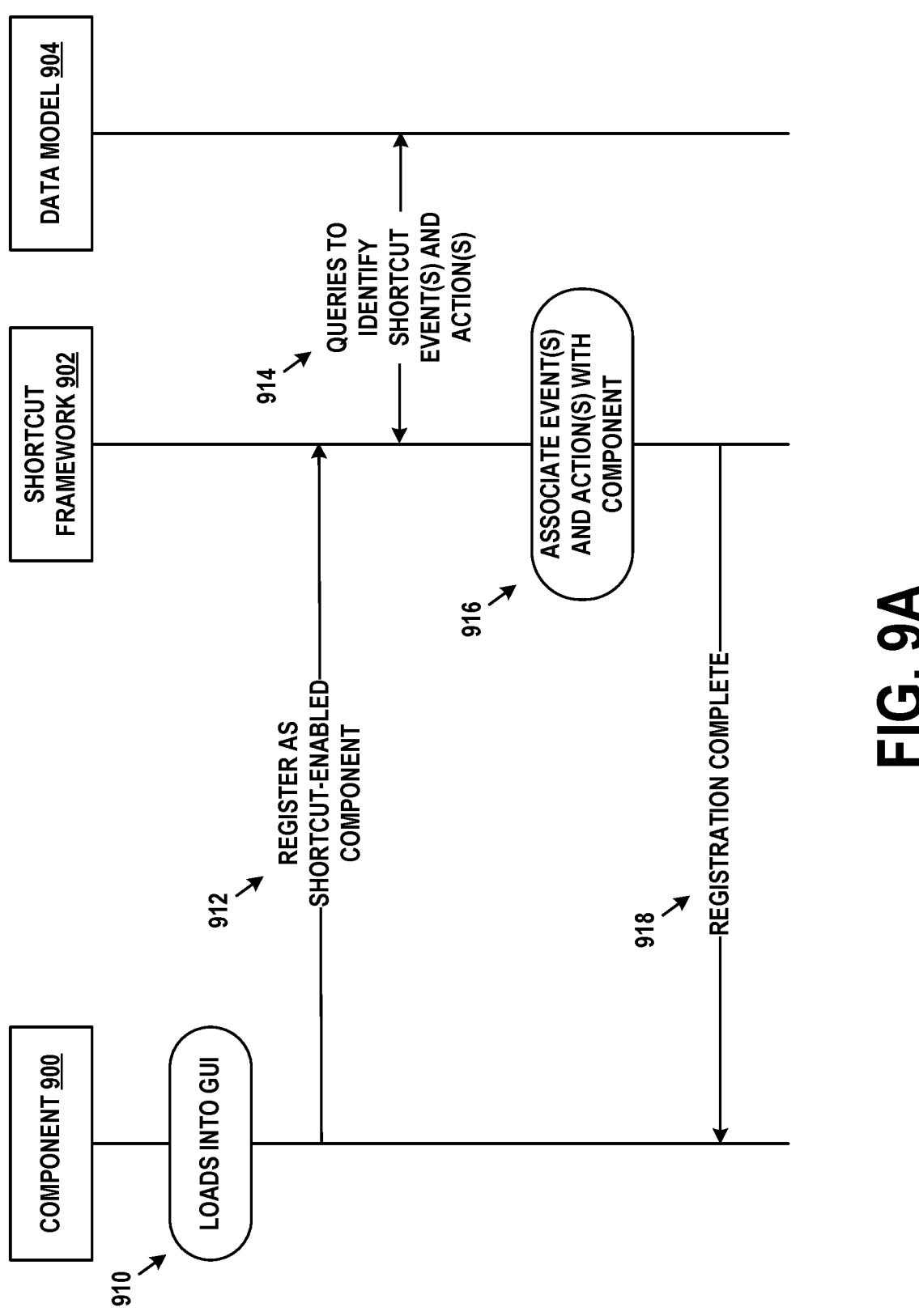
FIG. 9A depicts registration of a shortcut, in accordance with example embodiments.

FIG. 9A depicts how a shortcut can be associated with a component. Notably, component 900 (which may be the same or similar to component 804) seeks to register its shortcut(s) with shortcut framework 902. In doing so, shortcut framework 902 may query data model 904 (which may be similar to the data model of FIG. 8) to identify the appropriate shortcut events and shortcut actions. The procedure depicted in FIG. 9A may occur when a shortcut is loaded into a graphical user interface, or at some other point in time. Components may also be de-associated with a shortcut when they are no longer part of the graphical user interface.

At step 910, component 900 loads into a graphical user interface. This may be upon or in response to initiation or loading of the graphical user interface, or in response to a navigation or other event causing component 900 to load into the graphical user interface. In line with the discussion above, component 900 may define (e.g., in program code and/or data) zero or more functions that can be used as shortcut actions.

At step 912, possibly in response to loading, component 900 provides a request to register with shortcut framework 902 as a shortcut-enabled component. This request may be delivered by way of a function call or another type of API, for example. In doing so, component 900 may merely identify itself and indicate that it is shortcut enabled. Component 900 may not be aware of any shortcut events or shortcut actions that may impact it, as those items are defined by data model 904. In some cases, component 900 may have no shortcuts defined even though it is shortcut-enabled.

At step 914, possibly in response to receiving the request of step 912, shortcut framework 902 may query data model 904 to identify the shortcut event(s) and shortcut action(s) defined for component 900. This may involve searching and/or traversing one or more database table (such as those shown in FIG. 8) in order to find all of the relevant shortcut event(s) and shortcut action(s).

At step 916, possibly in response to the completion of step 914, shortcut framework 902 may associate the identified shortcut event(s) and shortcut action(s) with component 900. With this association in place, matching shortcut event(s) arriving at shortcut framework 902 can be easily dispatched to the proper component(s).

At step 918, possibly in response to completion of step 916, shortcut framework 902 may provide an indication to component 900 that the registration is complete.

Figure 9B:
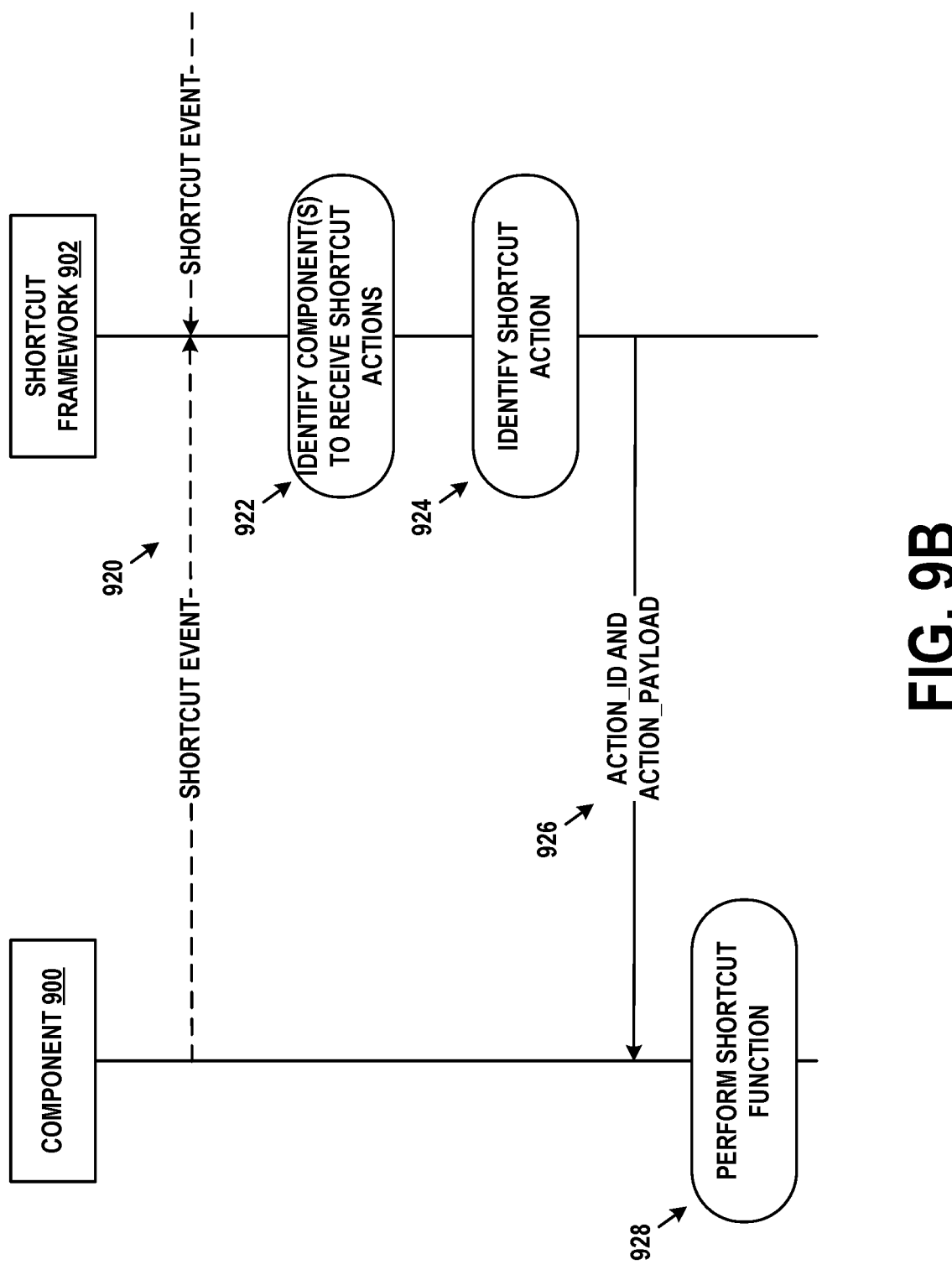
FIG. 9B depicts dispatch and performance of a shortcut action, in accordance with example embodiments.

FIG. 9B depicts how a shortcut event may arrive and be dispatched so that a component takes the associated action by way of its shortcut function. Here, component 900 have one or more shortcuts registered with shortcut framework 902 as shown in FIG. 9A.

At step 920, shortcut framework 902 receives a shortcut event (e.g., a keystroke defined by the shortcut field of data object 800). The shortcut event may be received from component 900 reporting reception of a keystroke, or some other source (e.g., a keyboard driver, an interrupt handler, or a network interface). The possibility of different sources is indicated by the dashed lines of step 920.

At step 922, possibly in response to receiving the shortcut event, shortcut framework 902 may identify one or more components to receive shortcut actions. In doing so, shortcut framework 902 may look up association(s) made using the registration phase (e.g., in step 916). Alternatively, if these associations are not available, shortcut framework may query the tables of a data model to identify the component. It is possible that, through declarative action shortcuts or other types of shortcuts, more than one component may be impacted. FIG. 6B provides an example of this, with a single shortcut event causing three different components to highlight their text with italics.

Moreover, it is possible that the shortcut event (even if it is received from component 900) might not be configured to impact component 900. For instance, component 900 might not have a shortcut function defined for the shortcut event. In this case, the next most-specific component (e.g., the component containing component 900) may be checked. If this component does not have a shortcut function defined for the shortcut event, the next most-specific component may be checked. As discussed above, this may involve iterating up the tree of components defined by the graphical user interface until a component with a shortcut function defined for the shortcut event is found. If no such component is found, the shortcut event may have no effect.

At step 924, assuming that component 900 is identified at step 922, shortcut framework 902 may identify a shortcut action associated with the shortcut event. Again, this can be determined from association(s) made using the registration phase or by querying the tables of a data model.

At step 926, assuming that a shortcut action is found for component 900, shortcut framework 902 provides the action_id and action_payload (as defined in data object 802, for example) to component 900. Notably, the action_payload is optional for some shortcuts.

At step 928, possibly in response to receiving the action_id and/or action_payload, component 900 performs the associated shortcut function. For example, component 900 may identify the function from the action_id, and then perform the function using parameters found in the action_payload.

Regarding the ability to cycle the focus of the graphical user interface through a subset of its components, as these components are loaded or removed from the graphical user interface, they may register and de-register with the shortcut framework accordingly. Thus, the subset of components may change with navigation through the graphical user interface or based on other events. At any given point in time, zero or more components may make up the subset. When there is at least one component in the subset, the shortcut event associated with this cycling may apply to these components. When there are at least two components in the subset, the cycling may be based on some pre-defined priority (e.g., a number between 0 and 5 associated with each component) and/or on the order in which the components in the subset were loaded. Other possibilities exist.

VIII. EXAMPLE TECHNICAL IMPROVEMENTS

These embodiments provide a technical solution to a technical problem. One technical problem being solved is the current lack of a flexible shortcut framework. In practice, this is problematic because shortcut triggers, events, and/or actions are hardcoded into components of a graphical user interface. Thus, a level of programming skill is needed to define a shortcut for a component. Further, changes to such a shortcut require a redesign of the component, which is a time-consuming and error-prone process.

The embodiments herein overcome these limitations by providing a flexible and highly-configurable shortcut framework with a separate data model. This results in several advantages. First, shortcuts can be defined, in a common format, for more than just keystrokes. Second, the framework allows adaptable mixing and matching of shortcut events to shortcut actions, which eliminates the need to program these into components or to redesign components when shortcut events or shortcut actions change. Third, shortcut actions can be rapidly dispatched to one or more components as needed with a hierarchical fallback procedure from most specific (the shortcut with the focus) to least specific (the component representing the entire screen of the graphical user interface. As a consequence, graphical user interfaces can be more easily and rapidly defined with consistent behavior in a low-code/no-code manner, and can also be rapidly modified without redesigning components.

Other technical improvements may also flow from these embodiments, and other technical problems may be solved. Thus, this statement of technical improvements is not limiting and instead constitutes examples of advantages that can be realized from the embodiments.

IX. EXAMPLE OPERATIONS

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining, by a shortcut framework associated with a graphical user interface, a shortcut event.

Block 1002 may involve identifying a component of the graphical user interface based on the component being associated with the shortcut event.

Block 1004 may involve identifying a shortcut action associated with the shortcut event, wherein the shortcut action specifies a shortcut action identifier associated with a shortcut function that modifies the graphical user interface.

Block 1006 may involve dispatching the shortcut action identifier to the component to cause the component to perform the shortcut function that modifies the graphical user interface.

In some implementations, the shortcut event is from an input modality.

In some implementations, the input modality is one of a keyboard, pointer, touch-based interface, or audio command.

In some implementations, the shortcut event represents a timer-related event or relates to a result of a remote application programming interface call.

In some implementations, modifying the graphical user interface comprises changing a visual appearance of the component.

In some implementations, the shortcut event was obtained from the component.

In some implementations, the shortcut action also specifies a shortcut action payload that provides input to the shortcut function.

In some implementations, the shortcut action is defined in a data model to include an action name, a definition of the shortcut action identifier, and a reference to the component, wherein the shortcut event is defined in the data model to include an event name, a description, and a further reference to the shortcut action as defined in the data model.

In some implementations, the shortcut event is associated with an indication of whether the shortcut event is active, wherein the shortcut action is identified and the shortcut action identifier is dispatched to the component only when the shortcut event is active.

In some implementations, the shortcut event is associated with an order that determines a precedence of the shortcut event when multiple shortcut events define a common shortcut.

In some implementations, the graphical user interface includes a plurality of components in a hierarchical arrangement, wherein identifying the component of the graphical user interface based on the component being associated with the shortcut event comprises: determining that a focus on the graphical user interface is on a first component of the plurality of components; determining that the first component is not a recipient of the shortcut event; and identifying, as the component associated with the shortcut event, a second component of the plurality of components in accordance with the hierarchical arrangement.

In some implementations, the graphical user interface includes a plurality of components, wherein a subset of the plurality of components including the component are identified as being associated with the shortcut event, and wherein one or more instances of the shortcut event cause at least some of the subset of the plurality of components to be modified.

In some implementations, the one or more instances of the shortcut event cause the subset of the plurality of components to be highlighted.

In some implementations, repeated instances of the shortcut event cause a focus of the graphical user interface to cycle through the subset of the plurality of components.

Some implementations may involve, prior to obtaining the shortcut event: loading the component into the graphical user interface; receiving, by the shortcut framework, a registration request from the component, wherein the registration request identifies the component as being shortcut-enabled; and possibly in response to the component being shortcut-enabled, associating, by the shortcut framework, the shortcut event with the shortcut action and the component.

X. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

obtaining, by a shortcut framework associated with a graphical user interface, a shortcut event, wherein the graphical user interface includes a plurality of components in a hierarchical arrangement;

identifying a shortcut action for the shortcut event, wherein the shortcut action specifies a shortcut action identifier for a shortcut function that modifies the graphical user interface;

determining that the shortcut action is a declarative shortcut action;

responsive to determining that the shortcut action is a declarative shortcut action, dispatching the shortcut action identifier to perform the shortcut function;

obtaining, by the shortcut framework, an instance of an additional shortcut event;

determining that the additional shortcut event is not identified with a declarative shortcut action;

responsive to determining that the additional shortcut event is not identified with a declarative shortcut action, identifying a target component of the graphical user interface by (i) determining that a focus on the graphical user interface is on the target component of the plurality of components, (ii) determining that the target component matches the additional shortcut event, and (iii) responsive to determining that the target component matches the additional shortcut event, identifying the target component;

identifying an additional shortcut action for the additional shortcut event, wherein the additional shortcut action specifies an additional shortcut action identifier for an additional shortcut function that modifies the graphical user interface; and dispatching the additional shortcut action identifier to the target component to cause the target component to perform the additional shortcut function that modifies the graphical user interface.

2. The method of claim 1, wherein the shortcut event is from an input modality.

3. The method of claim 2, wherein the input modality is one of a keyboard, pointer, touch-based interface, or audio command.

4. The method of claim 1, wherein the shortcut event represents a timer-related event or relates to a result of a remote application programming interface call.

5. The method of claim 1, wherein modifying the graphical user interface comprises changing a visual appearance of the target component.

6. The method of claim 1, wherein the additional shortcut event was obtained from the target component.

7. The method of claim 1, wherein the additional shortcut action also specifies a shortcut action payload that provides input to the additional shortcut function.

8. The method of claim 1, wherein the additional shortcut action is defined in a data model to include an action name, a definition of the additional shortcut action identifier, and a reference to the target component, and wherein the additional shortcut event is defined in the data model to include an event name, a description, and a further reference to the additional shortcut action as defined in the data model.

9. The method of claim 1, wherein the additional shortcut event is associated with an indication of whether the additional shortcut event is active, and wherein the additional shortcut action is identified and the additional shortcut action identifier is dispatched to the target component only when the additional shortcut event is active.

10. The method of claim 1, wherein the additional shortcut event is associated with an order that determines a precedence of the additional shortcut event when multiple shortcut events define a common shortcut.

11. The method of claim 1, wherein a subset of the plurality of components including the target component are identified as being associated with the additional shortcut event, and wherein one or more instances of the additional shortcut event cause at least some of the subset of the plurality of components to be modified.

12. The method of claim 11, wherein the one or more instances of the additional shortcut event cause the subset of the plurality of components to be highlighted.

13. The method of claim 11, wherein repeated instances of the additional shortcut event cause the focus of the graphical user interface to cycle through the subset of the plurality of components.

14. The method of claim 1, further comprising prior to obtaining the additional shortcut event:

loading the target component into the graphical user interface;

receiving, by the shortcut framework, a registration request from the target component, wherein the registration request identifies the target component as being shortcut-enabled; and in response to the target component being shortcut-enabled, associating, by the shortcut framework, the additional shortcut event with the additional shortcut action and the target component.

15. A non-transitory computer-readable medium, having stored thereon program instructions that, upon execution by a computing system, cause the computing system to perform operations comprising:

obtaining, by a shortcut framework associated with a graphical user interface, a shortcut event, wherein the graphical user interface includes a plurality of components in a hierarchical arrangement;

identifying a shortcut action for the shortcut event, wherein the shortcut action specifies a shortcut action identifier for a shortcut function that modifies the graphical user interface;

determining that the shortcut action is a declarative shortcut action;

responsive to determining that the shortcut action is a declarative shortcut action, dispatching the shortcut action identifier to perform the shortcut function;

obtaining, by the shortcut framework, an instance of an additional shortcut event;

determining that the additional shortcut event is not identified with a declarative shortcut action;

responsive to determining that the additional shortcut event is not identified with a declarative shortcut action, identifying a target component of the graphical user interface by (i) determining that a focus on the graphical user interface is on the target component of the plurality of components, (ii) determining that the target component matches the additional shortcut event, and (iii) responsive to determining that the target component matches the additional shortcut event, identifying the target component;

identifying an additional shortcut action for the additional shortcut event, wherein the additional shortcut action specifies an additional shortcut action identifier for an additional shortcut function that modifies the graphical user interface; and dispatching the additional shortcut action identifier to the target component to cause the target component to perform the additional shortcut function that modifies the graphical user interface.

16. The non-transitory computer-readable medium of claim 15, wherein the additional shortcut action is defined in a data model to include an action name, a definition of an additional shortcut action identifier, and a reference to the target component, and wherein the additional shortcut event is defined in the data model to include an event name, a description, and a further reference to the additional shortcut action as defined in the data model.

17. The non-transitory computer-readable medium of claim 15, wherein the additional shortcut event is associated with an order that determines a precedence of the additional shortcut event when multiple shortcut events define a common shortcut.

18. The non-transitory computer-readable medium of claim 15, wherein the additional shortcut action also specifies a shortcut action payload that provides input to the additional shortcut function.

19. A system comprising:

one or more processors; and memory, containing program instructions that, upon execution by the one or more processors, cause the system to perform operations comprising:

obtaining, by a shortcut framework associated with a graphical user interface, a shortcut event, wherein the graphical user interface includes a plurality of components in a hierarchical arrangement;

identifying a shortcut action for the shortcut event, wherein the shortcut action specifies a shortcut action identifier for a shortcut function that modifies the graphical user interface;

determining that the shortcut action is a declarative shortcut action;

responsive to determining that the shortcut action is a declarative shortcut action, dispatching the shortcut action identifier to perform the shortcut function;

obtaining, by the shortcut framework, an instance of an additional shortcut event;

determining that the additional shortcut event is not identified with a declarative shortcut action;

responsive to determining that the additional shortcut event is not identified with a declarative shortcut action, identifying a target component of the graphical user interface by (i) determining that a focus on the graphical user interface is on the target component of the plurality of components, (ii) determining that the target component matches the additional shortcut event, and (iii) responsive to determining that the target component matches the additional shortcut event, identifying the target component;

identifying an additional shortcut action for the additional shortcut event, wherein the additional shortcut action specifies an additional shortcut action identifier for an additional shortcut function that modifies the graphical user interface; and dispatching the additional shortcut action identifier to the target component to cause the target component to perform the additional shortcut function that modifies the graphical user interface.

20. The system of claim 19, wherein the additional shortcut action also specifies a shortcut action payload that provides input to the additional shortcut function.

* * * * *